March 26, 1940. H. A. SMITH 2,194,837
SUPPORTING BASE FOR ELECTRIC APPLIANCES
Filed Feb. 2, 1938
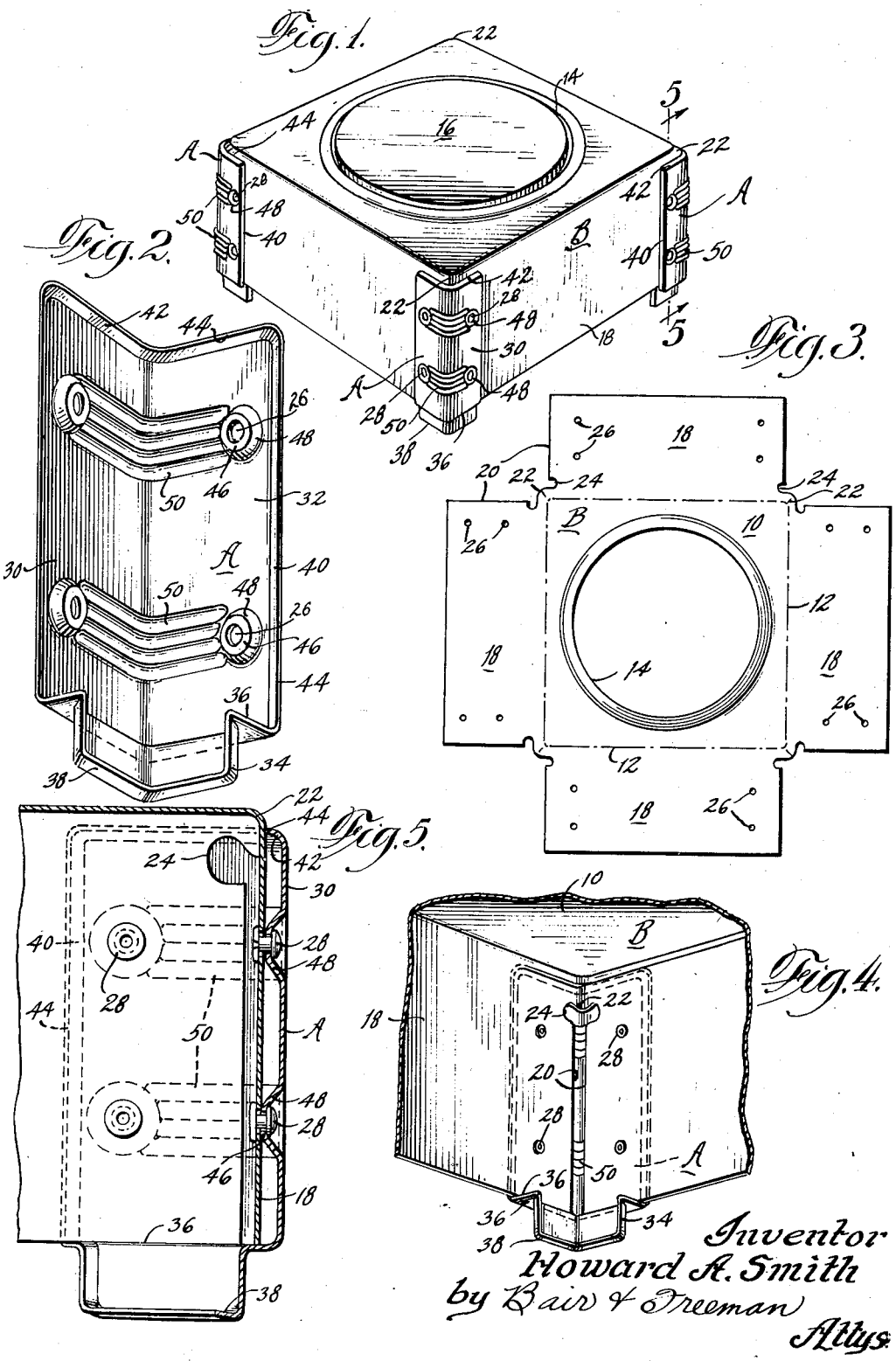
Inventor
Howard A. Smith
by Bair & Freeman
Attys.

Patented Mar. 26, 1940

2,194,837

UNITED STATES PATENT OFFICE 2,194,837

SUPPORTING BASE FOR ELECTRIC APPLIANCES

Howard A. Smith, St. Louis, Mo., assignor to Knapp-Monarch Company, St. Louis, Mo., a corporation of Missouri Application February 2, 1938, Serial No. 188,295

7 Claims. (Cl. 248—174)

Among the objects of my invention is the provision of a new and improved electric appliance supporting means which is simple, durable and comparatively inexpensive to manufacture.

Another object is the provision of a supporting means for an electric appliance casing or the like which forms also a tie for the corners of the casing.

Still another object is to provide a supporting means for an electric appliance casing which is stamped from sheet material and so formed at the edges that it gives the appearance of being made of much heavier material.

A further object is the provision of supporting legs for an electric stove or other appliance casing formed from stampings wherein the edges are turned over at a sharp angle to simulate thickness and to add to the rigidity of the part and wherein rivet holes are provided with countersunk portions of sufficient depth to permit them to freely contact the casing at the bases thereof so that when the rivets are firmly attached there will be no danger of forcing the face portion of the stamping into a dent or crease.

A still further object is the provision of dished angular stampings forming legs for an electric appliance casing adapted to be secured by riveting to said casing and provided with corrugations running between pairs of rivet holes on opposite sides of the angular legs to increase the rigidity and to improve the appearance of the device.

Still a further object is to provide an electric appliance casing supported by a novel leg structure wherein the casing is built of sheet material bent into form from a pattern cut out to provide an excess of material at the corners so that when formed, the points of the corners will be rounded and closed, the legs for said casing being angular stampings with edges turned inward to provide rigidity and a broad supporting foot, there being also an inwardly projecting shelf-like structure near the bottom forming a supporting ledge for the edges of the casing.

With these and other objects in view, my invention consists in the construction, arrangement and combination of the various parts of my improved electric appliance, whereby the objects contemplated are attained, as hereinafter more fully set forth, pointed out in my claims, and illustrated in the accompanying drawing, in which:

Figure 1 is a perspective view of a complete device.

Figure 2 is an inside perspective view of one of the legs on a slightly larger scale.

Figure 3 is a top view of the blank from which the casing is bent.

Figure 4 is a fragmentary inside view of a corner of the assembled casing; and

Figure 5 is a longitudinal section on the line 5—5 of Figure 1 on a slightly larger scale.

In the construction of modern insulated electric appliances a great many factors must be taken into consideration in order to put a sturdy, well appearing device on the market which will sell in a price range within reach of persons of moderate income comprising a great percent of the buying public. In building such a device which is inexpensive and at the same time of substantial construction, it becomes necessary to use inexpensive material such as sheet metal and to form it and brace it in such a manner that it will be structurally rigid and will at the same time give the appearance of ruggedness and weight. The device must be well braced for purposes of safety, housing as it does, a household electrical unit operating at 110 volts or upwards and also must be capable of standing considerable abuse over a period of time.

The supporting means for an electrical appliance herein disclosed is embodied in four legs designated A attached to the four corners of a casing B, housing an electric stove. The casing itself is formed of sheet metal bent into shape and tied at the corners by riveting the legs thereto, said legs being slightly longer than the thickness of the assembled casing so that when resting on a table or similar surface they serve to elevate the casing proper a slight amount in order to provide a circulating air space beneath it for insulating purposes.

The sheet metal casing B is laid out first in the form of a pattern shown in Figure 3 with the outline of a square flat top 10 defined by a dot and dash line 12. At the center of the top there is a circular aperture 14 to provide an opening to give access to a hot plate or grill 16 beneath which is a suitable electric heating element.

On each of the four sides of the top there are provided flaps 18 of a substantially rectangular shape having side edges 20 each forming with the edge of an adjacent flap a substantially right angular recess. This recess has a particular construction in that instead of there being a right angled point where the sides 20 join each other adjacent the top plate, there is a protruding tongue-like portion 22 extending out into the recess flanked on either side by cut out portions 24 extending inwardly into the adjacent flaps 18. The tongue-like portions and the cut out portions are symmetrically disposed on all sides of the casing. There are also provided suitable rivet holes 26 near the ends of each flap.

When the sheet metal casing is bent into shape by creasing the flaps at right angles along the dot and dash line 12, rounded closed points are formed by the tongue-like portions 22 at the corners so that the casing appears substantially solid. It is further true that by rounding the points of the corners in this manner a much more substantial top plate 10 is formed since all of the edges thereof defined by the lines 12 act as a flange. When the flaps have been bent into place, the legs A are attached by suitable rivets 28 in a position such that they completely cover the open corners formed by the sides 20 of the flaps and extend upward so as to overlap slightly the tongue-like portions 22 and completely conceal any appearance of a joint at the corners.

In order to carry out the illusion of weight and to supply the requisite rigidity, the legs A made from stampings of sheet metal are in this embodiment formed by bending the stamping along its longitudinal axis giving the legs individually the appearance of right angle sections with the faces 30 and 32 at right angles to each other. The leg thus formed is unusual in that a bottom portion 34 extends inwardly from the plane of the faces 30 and 32. The formation of this inwardly extending bottom portion is productive of a sleeve or ledge 36 upon which adjacent edges of the flaps 18 may rest. The extreme bottom portion 38 of the leg is curled upwards in order to supply a smooth rounded foot for the leg and at the same time add to the rigidity of the structure.

Both side edges 40 and the top edge 42 of the legs are bent sharply inwards in order to form flanges around the perimeter of the stamping comprising the leg A in order to make the entire structure rigid and at the same time produce an illusion of thickness. With the edges turned sharply as shown the rim 44 of the stamping forms the actual line of contact between said leg and the casing. The leg has the appearance of a somewhat angularly dished member. Furthermore, by turning the edges of the legs inward in the manner described, the joint between the surface of the casing and the legs is formed much more snugly.

In order to minimize the cost of assembling the combined casing and supporting means described herein, the legs are designed to be riveted fast to the casing and since the legs are dished it is necessary to countersink the rivet holes in them an amount sufficient so that a base 46 of the countersunk portion 48 actually comes into contact with the surface of the casing to which it is attached. This means that the depth of the countersink should be approximately equal to the depth of the flange at the edge of the legs, or perhaps a small fraction of an inch less, so that when the rivet is driven into place there will be no denting nor wrinkling of the dished portion of the stamping forming the faces of legs A. There is an added benefit in having the countersunk portion of the rivet holes designed in this manner in that it provides an added point of support for the leg against the casing thereby adding greatly to the sturdiness of construction.

In order to take advantage of every possible opportunity to build solidity into the device another expedient is taken advantage of which is embodied in a series of corrugations 50 extending around the corners of the legs between pairs of rivet holes. By extending corrugations around the corners, this added rigidity is built into the device governed by the familiar principle used for example in strengthening sheet iron piping except that herein the corrugations extend in only a partial curve between reinforced points such as the countersunk rivet holes where added rigidity is most greatly needed. At the outer edges of the countersunk rivet holes the flanges previously described supply sufficient rigidity.

There has been provided therefore a sheet metal casing of extremely simple design which is held together by angular sections at the corner in an extremely sturdy construction which moreover is extremely simple in design for having been reduced to only the essential elements. It is furthermore significant that not only has there been incorporated a novel arrangement of reinforcing structure into the members comprising the device, but also has there been incorporated a solidness and ruggedness of appearance and a symmetry of design supplied by the same means responsible for supplying reinforcement and rigidity.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A support for an electric appliance comprising a casing housing the appliance, a leg formed of a thin section of metal bent along the longitudinal axis to form sides for engaging adjacent sides of the casing and having side and top edges bent sharply inwards toward the casing forming flanges having edgewise contact therewith to increase the rigidity and simultaneously to produce the illusion of thickness, recesses in the surfaces of said legs and countersunk anchoring means in the recesses beneath said surfaces holding the sides of the legs against the sides of the casing at the edges of the flanges.

2. A support for an electric appliance comprising a casing for housing the appliance, a leg formed of a metal stamping bent along the longitudinal axis so as to engage adjacent sides of the casing and having side and top edges bent sharply inwards toward the casing forming flanges having edgewise contact therewith to increase the rigidity and simultaneously to produce the illusion of thickness, said top flange having an angular shape to fit against adjacent sides of the casing, a bottom edge for the leg curved inwards and upwards to form a smooth foot in contact with a supporting surface for supporting the leg on said surface and securing means holding the edges of said flanges tightly against said casing.

3. A support for an electric appliance casing comprising a leg formed of a thin section of metal bent along the longitudinal axis forming side faces adapted to engage adjacent sides of the casing, the outer edges being bent inwardly toward the casing to increase rigidity and simultaneously to produce an illusion of thickness, and a lower section at both sides of said leg bent sharply inwards into the form of a substantially horizontal shelf to support the casing wall and bent downwards from the shelf to form a supporting portion of the leg.

4. A support for an electric appliance casing comprising a leg formed of a metal stamping adapted to engage sides of the casing, having side and top edges bent sharply inwards toward the casing forming flanges for edgewise contact and means forming a plurality of rivet holes stamped in the leg and countersunk to a depth equivalent to the depth of the flanges so that when the leg is riveted to the casing the countersinks and flanges are drawn together against the surface of the casing to form for the leg a multiple bracing contact with said casing.

5. A support for an electric appliance casing comprising a leg formed of a metal stamping bent along the longitudinal axis to engage adjacent sides of the casing having side and top edges bent sharply inwards toward the casing, means forming a plurality of rivet holes countersunk to a depth substantially equal to the depth of the flange to provide direct contact with the casing sides, and a series of corrugations extending between adjacent rivet holes on opposite sides of the bent leg adapted simultaneously to provide strength, rigidity and decoration for said leg.

6. An electric appliance casing and support therefor formed from a polygonal metallic sheet forming a top having a plurality of flaps bent at an angle to the top forming walls for the casing separated by cut out corners along adjacent sides of each, said sides intersecting at an angle and being provided each with a cut back portion projecting inward from the edges adjacent the point of intersection of two adjacent sides with the top and a tongue protruding into said intersection from the top cooperable with the cut back portions to provide a solid rounded corner for the three intersecting parts, and a plurality of legs comprising stampings supportively engaging adjacent sides of the casing at the corners and positioned thereon so as to completely conceal the edges of the flaps forming said corners.

7. An electric appliance casing and support therefor comprising a polygonal metallic sheet including a flat top piece and a plurality of flaps having sides positioned parallel to and separated from sides of adjacent flaps and in a downwardly bent position with respect to the top forming walls for the casing separated by open corners, means forming a tongue at the upper end of each open corner rounded over at the point of the corner so as to close the upper end of the open space, and a leg for each corner formed from a stamping having sides bent at an angle with the longitudinal axis thereof supportively engaging adjacent sides of the casing, said leg having the outer edges flanged inward toward the casing to provide reinforcement and to conceal the remaining portion of the open corner of the casing and having the lower section thereof bent inward into the form of a shelf for supporting the casing at its lower edge, there being provided a rounded bottom portion for said leg below the shelf forming a foot for supporting the appliance.

HOWARD A. SMITH.